No. 734,200. PATENTED JULY 21, 1903.
G. W. STEVENS.
DEVICE FOR DECREASING THE NOISE UPON RAILROADS OR OTHER ROLLING MACHINERY.
APPLICATION FILED OCT. 31, 1902.
NO MODEL.
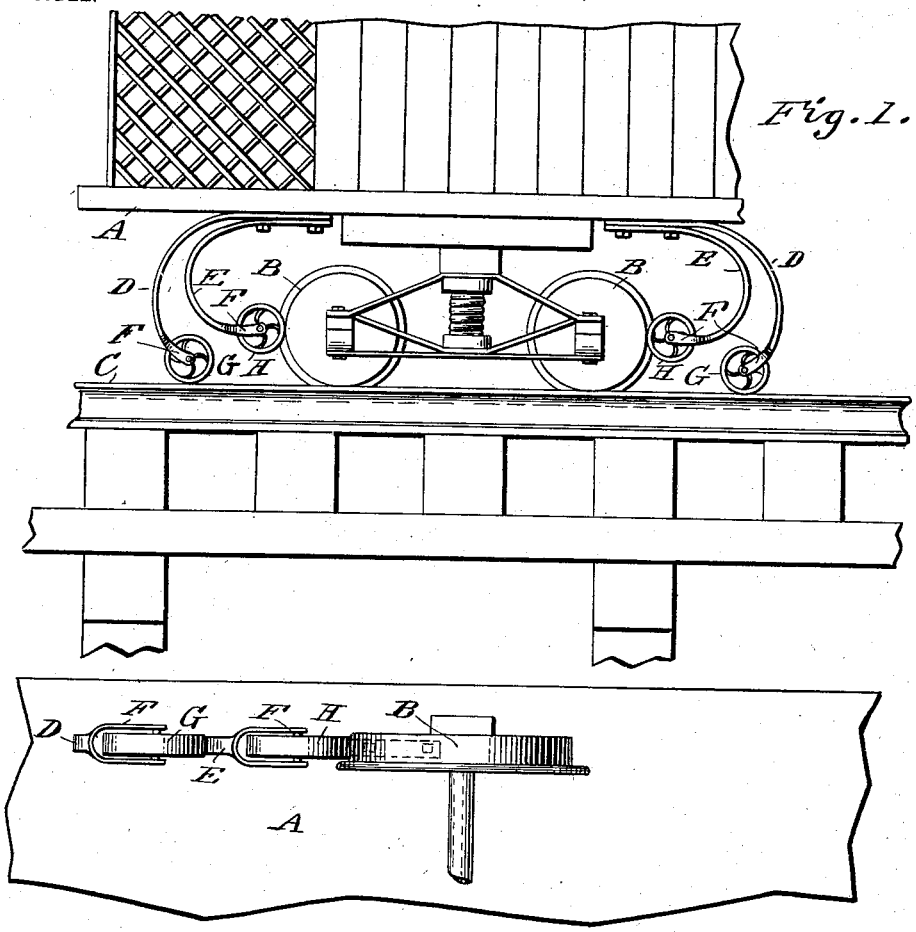

No. 734,200. Patented July 21, 1903.

UNITED STATES PATENT OFFICE.

GEORGE W. STEVENS, OF BOSTON, MASSACHUSETTS.

DEVICE FOR DECREASING THE NOISE UPON RAILROADS OR OTHER ROLLING MACHINERY.

SPECIFICATION forming part of Letters Patent No. 734,200, dated July 21, 1903.

Application filed October 31, 1902. Serial No. 129,562. (No model.)

*To all whom it may concern:*

Be it known that I, GEORGE W. STEVENS, a citizen of the United States, residing at Boston, in the county of Suffolk and State of Massachusetts, have invented certain new and useful Improvements in Noise-Deadening Devices for Railways or Machinery, of which the following is a specification.

This invention relates to improvements in devices for decreasing the noise upon railroads and other rolling machinery; and the main object of my invention is the addition to a vehicle of a means whereby the noise is decreased by contacting the wheels of the vehicle and also the rails upon which said wheels operate, this mechanism being especially desirable and constructed for use upon elevated railways.

To attain the desired objects, the invention consists of a device of this character embodying novel features of construction and combination of parts substantially as disclosed herein.

In the accompanying drawings, Figure 1 is a side elevation of a portion of the elevated railway-track with a car thereon having my invention in operative connection therewith. Fig. 2 is a bottom plan view of a car having the attachment, and Fig. 3 is an enlarged detailed view of the attachment removed.

Referring to the drawings, A designates a car-platform mounted upon the wheels B, which rest upon the tracks C.

In order to properly deaden the noise occasioned by the rolling of the cars upon the track, it is desirable to use devices which will contact the car-wheels and also the rails, and in order to do this properly I provide the spring-arms D and E, which are short and long, respectively, and are secured at their upper ends to the truck-frame or body of the car. Each one of these spring-arms is provided upon its lower end with the journals F, in which are revolubly mounted the noise-deadening wheels G and H, respectively, which have their peripheries in contact, respectively, with the peripheries of the car-wheels on the upper surface of the tracks. These wheels are similarly constructed and are made of the inner metal spokes and rim J, which are provided with tires K, made of a soft material—such as rubber, felt, or other soft material—said tire being adapted to be held in contact with the wheels and track by means of the supporting-springs, which allow the proper tension and elasticity. These devices are attached to trucks of large cars and to the platforms of small cars.

From the foregoing description, taken in connection with the drawings, it is evident that I provide a device to be attached to any machinery where a great amount of noise is produced and which by being placed in contact with the balance-wheels, drive-wheels, or, in the case of rolling-stock and railways, in contact with the wheels and track will decrease the noise.

What I claim as new, and desire to secure by Letters Patent, is—

1. The combination with a railway-track and railway rolling-stock, of soft-tread wheels adapted to contact the wheels of the rolling-stock and the railway-track, and means carried by the rolling-stock for supporting said soft-tread wheels.

2. The combination with a railway-track and railway rolling-stock, of a series of long and short arms connected to and depending from the rolling-stock, and soft-tread wheels carried by said arms adapted to contact the wheels of the rolling-stock and the railway-track.

3. The combination with a railway-vehicle and a track, of a series of long and short elastic arms secured to and depending from the platform of said vehicle, a soft-tread wheel carried by each of the long arms and held in contact with the track by said arms, and a series of soft-tread wheels carried by the short arms and held in contact with the wheels of the vehicle.

In testimony whereof I affix my signature in presence of two witnesses.

GEORGE W. STEVENS.

Witnesses:
RICHARD WOODS,
JOSEPH F. DEAN.